United States Patent [19]

Falco

[11] Patent Number: 4,930,284
[45] Date of Patent: Jun. 5, 1990

[54] MASONRY ANCHOR

[76] Inventor: Gene A. Falco, 34 Windemere Way, Woodbury, N.Y. 11797

[21] Appl. No.: 341,276

[22] Filed: Apr. 19, 1989

Related U.S. Application Data

[63] Continuation of Ser. No. 135,662, Dec. 21, 1987, abandoned, which is a continuation of Ser. No. 34,591, Mar. 30, 1987, abandoned.

[51] Int. Cl.$^5$ .............................................. E04B 1/48
[52] U.S. Cl. ........................................ 52/704; 52/508; 52/513; 411/23
[58] Field of Search .............. 52/704, 508, 513, 384, 52/385; 405/259, 260, 261; 411/23, 82, 44, 69, 57, 258

[56] References Cited

U.S. PATENT DOCUMENTS

| | | | |
|---|---|---|---|
| 2,849,866 | 9/1958 | Flygare et al. | 411/23 X |
| 3,397,498 | 8/1968 | Murphy | 52/385 |
| 3,471,183 | 10/1969 | Fischer | 52/508 |
| 3,901,039 | 8/1975 | Lundkvist | 405/260 X |
| 4,224,971 | 9/1980 | Muller et al. | 411/23 X |
| 4,270,331 | 6/1981 | Lang et al. | 52/704 X |
| 4,528,792 | 7/1985 | Cross et al. | 52/704 |
| 4,564,324 | 1/1986 | Leibhard | 411/44 X |
| 4,620,406 | 11/1986 | Hugel et al. | 52/704 |

FOREIGN PATENT DOCUMENTS

| | | | |
|---|---|---|---|
| 233091 | 3/1961 | Australia | 405/260 |
| 198005 | 6/1958 | Austria | 405/261 |
| 2748919 | 5/1979 | Fed. Rep. of Germany | 411/69 |
| 20330 | 6/1929 | Netherlands | 52/704 |
| 435382 | 11/1974 | U.S.S.R. | 411/69 |
| 458584 | 12/1936 | United Kingdom | 411/44 |
| 661111 | 11/1951 | United Kingdom | 411/23 |

Primary Examiner—Michael Safavi
Attorney, Agent, or Firm—Bauer & Schaffer

[57] ABSTRACT

An axially elongated perforated tube having a leading end and a trailing end. The tube is restricted at its leading end and open at its trailing end for the insertion of an adhesive and a ram to extrude the adhesive. The ram is conically tapered having its smaller diameter at its leading end.

3 Claims, 1 Drawing Sheet

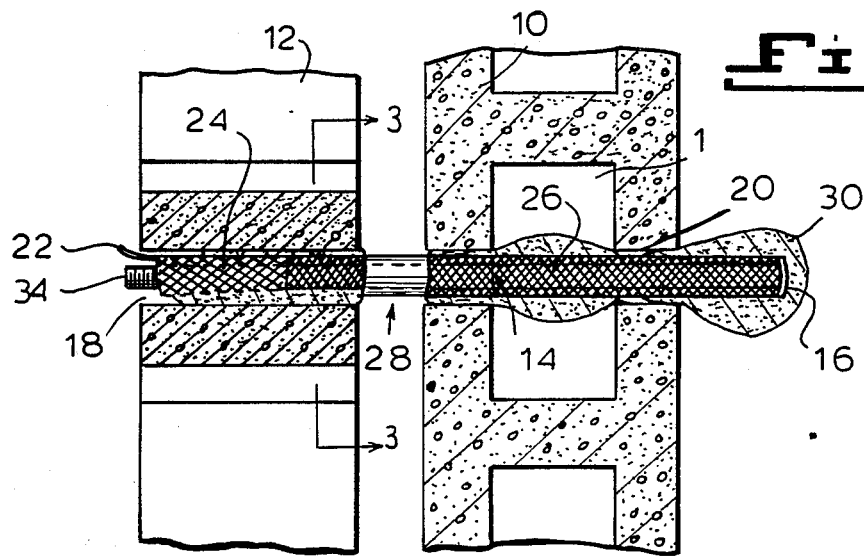
Fig. 1
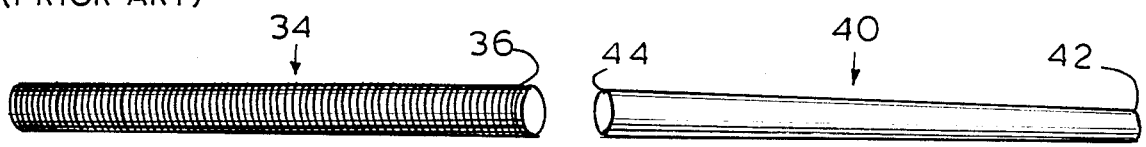
Fig. 2 (PRIOR ART)
Fig. 4
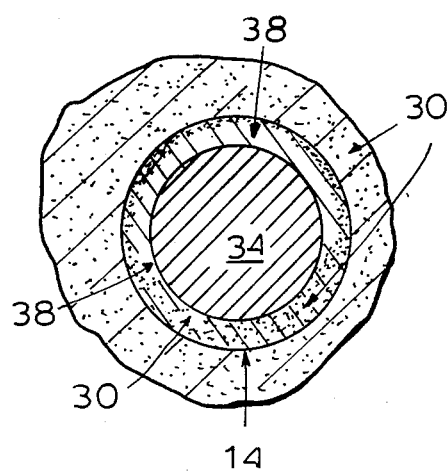
Fig. 3 (PRIOR ART)
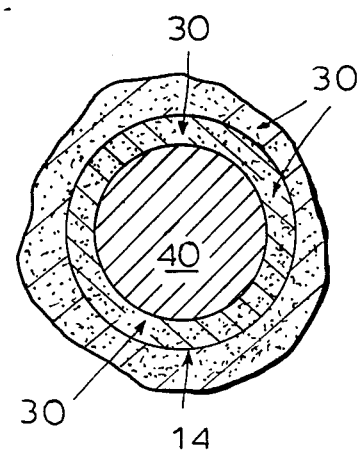
Fig. 5

MASONRY ANCHOR

RELATED APPLICATION

This is a continuation of Ser. No. 135,662 filed 12/21/87, which is a continuation of Ser. No. 034,591, filed 3/30/87, now abandoned.

BACKGROUND OF THE INVENTION

The present invention relates to a method and device for fastening and/or fixing masonry wall elements, together and in particular, to a tapered or cone shaped anchoring pin for use in assembly with a hardenable mass and porous tubular sleeve for anchoring masonry wall elements.

In our earlier, and copending application, Ser. No. 06/880,287 filed June 30, 1986, and its continuation Ser. No. 07/047,167 filed May 7, 1987, we disclosed a system wherein, in certain specialized fastening applications, such as masonry stabilization of buildings, or the attachment of facades to cement supports, anchors are produced by inserting a porous tubular sleeve (such as wire mesh) into a previously formed opening in the masonry and a hardenable mass is introduced into the sleeves under pressure. Such mesh sleeves limit the amount of the hardenable mass being introduced and, also creates a holding effect in any hollow areas of the masonry structure by virtue of the mass passing through the openings of the porous sleeve. After the mass is introduced into the sleeve and positioned within an opening in the masonry, an anchoring element is rammed into the sleeve. The anchoring rod becomes fixed in the hardenable mass once the mass cures, the assembly thus forms a unitary anchor with the porous sleeve.

Other systems employing rods are illustrated in Hugel U.S. Pat. No. 4,620,406 and Cross U.S. Pat. No. 4,528,792.

In general, the masonry fastening systems to which the present invention relates, employ thixotropic, or gel-like hardenable masses such as polyester resins, epoxies, etc., which are capable of being supported in the uncured state by the porous sleeve or a simple hole, prior to and during the insertion of the anchoring ram. The curing properties, as well as the adhesion and flow characters of such hardenable masses vary, depending upon the specific recipe and composition thereof. Nevertheless, an ordinary threaded rod, when rammed into the sleeve filled with the uncured hardenable mass, displaces substantially more of the hardenable mass than the actual volume of the threaded rod. In fact, virtually all of the hardenable mass becomes displaced axially through the pores of the sleeve, leaving only a negligible amount of the hardenable mass between the threaded rod and the inside diameter of the sleeve. Thus, adhesion to the threaded rod is substantially diminished.

It is an object of the present invention to provide an anchoring pin, for masonry construction systems of the type heretofore described which provides more uniform distribution of the adhesive into the connecting sleeve and/or hole.

It is a particular object of the present invention to provide an anchoring pin which when inserted into a porous sleeve or connecting hole, filled with a thixotropic adhesive, which element does not displace substantially more of the adhesive, than its own volume, thereby insuring improved adhesion between the anchoring element and the masonry.

It is also an object of the present invention to provide an improved method for fastening and/or fixing masonry wall elements employing a porous sleeve, a thixotropic adhesive and a tapered pin.

The foregoing objects, together with other objects and advantages, will be apparent from the following disclosure.

SUMMARY OF THE INVENTION

In accordance with the present invention, a masonry fastening system in which a porous sleeve filled with a hardenable adhesive mass is inserted in a hole interconnecting two or more masonry elements is provided with an anchoring pin having a tapered or conical-shape, with its smaller diameter at its forward end and gradually increasing in cross-sectional area to its rear end, the anchoring pin being insertable into the sleeve, through the hardenable mass.

The use of the tapered anchoring pin in the system employing a porous sleeve filled with a hardenable (curable) adhesive mass is greatly advantageous as it enables a simpler, easier and less costly method of establishing a unitary anchor. When the smaller diameter end of the tapered pin is inserted into the open end of the porous sleeve filled with a hardenable uncured mass, it does not displace substantially more than its own volume because the gradual increase in cross-sectional area of the pin increasingly takes up the void which would be created during insertion of a cylindrically-shaped element.

Since the fluid dynamics achieved through the use of the tapered pin results in the displacement of substantially its own volume, more of the hardenable mass is maintained within the sleeve between the anchoring element and the porous sleeve. There is therefore better adhesion of the hardenable mass to the anchoring element. Also, since the hardenable mass, the porous sleeve, and the tapered pin are all now integrally engaged, the strength of the entire anchor is improved, moisture infiltration and stress are significantly reduced.

Preferably, the tapered pin is made of metal, such as stainless steel, and with a substantially smooth outer surface. However, other types of materials may be used provided they exhibit adequate tensile and shear strengths. Various polymer materials such as nylons or polyesters would provide excellent strength characteristics at a lower production cost than metal threaded rod. The surface texture of the tapered anchoring element may also be varied depending upon the bond characteristics of the hardenable mass in order to maximize ahhesion.

Full details of the present invention are set forth in the following disclosure and illustrated in the accompanying drawings.

BRIEF DESCRIPTION OF THE DRAWINGS

In the drawings:

FIG. 1 is a section view of a masonry construction showing the fastening system to which the present invention is applied;

FIG. 2 is a perspective view of the conventional prior art threaded anchoring rod;

FIG. 3 is a cross-sectional view taken for example, along line 3—3 of FIG. 1 showing the normal distribution of the hardenable adhesive under action of the prior art threaded anchoring rod;

FIG. 4 is a perspective view of the tapered anchoring pin of the present invention; and FIG. 5 is a cross-sectional view similar to that of FIG. 3 showing the improved distribution of the hardenable adhesive under the present invention.

DESCRIPTION OF THE INVENTION

In order to better illustrate the present invention, there is shown in FIG. 1, a typical connection between two masonry elements, namely a concrete supporting wall 10 and a decorative brick facade 12. In FIG. 1, the fastening system shown in my aforementioned copending application Ser. No. 07/047,167, to which reference may be made for further details, is employed.

As seen in FIG. 1, a wire mesh sleeve, generally indicated by the numeral 14, is closed at its leading edge by a solid slug 16 and open at its trailing end 18. The sleeve 14 is inserted in a hole 20 extending through both masonry elements 10 and 12, being easily manipulated from its trailing end 18, by a tab 22 which, extends outwardly of the hole 20. The wire mesh has an open (more airy) weave of higher porosity at its rear section 24 than at its forward section 26 to allow for selectively higher rates of radial extrusion at 24, its rear section. An impervious band 28 may be located between the two sections to prevent extrusion between the facade 12 and the wall 10.

The sleeve 14 is initially filled with adhesive material 30 to the extent that no voids or air spaces are found in the filling and is then inserted through the concrete block 10 and the brick facade 12. A threaded cylindrical rod ram 34 is inserted into the trailing end 18 of the sleeve 14 toward the leading end 16, forcing the adhesive material 30 within the sleeve 14 axially toward the forward end 16. The adhesive material is thereby extruded radially outward, into contact with the surfaces of the brick facade 12, and supporting concrete wall 10, acting to tie these masonry elements together.

It has been found that when the ram 34 is formed in accordance with the prior art, as illustrated in FIG. 2, namely an elongated solid cylindrical rod 34 of uniform diameter and threaded on its outer surface, the cross-sectional distribution of the hardenable adhesive mass takes the configuration as illustrated in FIG. 3, wherein the annular space between the ram and the porous sleeve is full of voids or empty spaces 38 wherein no or relatively small quantities of adhesive is located. As a result, there is negligable engagement of the rod 34, with the sleeve 14, and an extending poor anchoring system with the adhesive mass is created. These void or empty spaces 38 are formed by the axial movement of the rod 34 through the plastic or soft moldable adhesive causing cavitation and aeration within the mass. Ultimately when the mass 30 hardens, the voids become fixed. The creation of the voids 38 is exacerbated even more by the existance of threads 36 on the rods which increase the surface manipulation and cavitation of the soft, plastic, uncured adhesive. The thixotropic adhesive mass 30, noted earlier as being self-supporting even in the uncured state, will cure without coalescing into a cohesive mass producing unstable and short lived masonry connections.

The disadvantages shown with the use of the prior art ram-rod devices is overcome by the present invention as illustrated in FIGS. 4 and 5. In the present invention, an anchoring pin 40 is provided, having a tapered or conical shape. The taper of the pin 40 is uniformly formed and increases along its length from the front end 42 relatative to its central axis to the rear end 44. The smaller diameter end 42, at the forward end with respect to the direction of insertion into the sleeve 14, may be truncated, since the fluid dynamics of a tapered pin obviates the need of a sharp point. Thus, the expense of forming a sharp point, and the expense of providing safe packaging or devices for their handling may be eliminated. The widest diameter end 44 is of course, at its rear end. The length of the tapered pin 40 will, of course, approximate that of the sleeve 14 into which it is to be inserted. The tapered pin 40 may be lengthened so as to extend from the face of the masonry. Thus, the length as well as the diameters of the pin can be selected to conform to the application in which it is used.

Preferably, the tapered pin 40 is made of metal, such as stainless steel. It may be made of other materials having sufficient tensile and shear strength for the intended purposes. Nylon and similar polyesters may be used. The surface of the tapered pin is preferably left substantially smooth, although it may be textured for better adhesion to the hardenable mass. Threads or gross working of the adhesion surface is not necessary.

Thus as seen in FIG. 5, when the tapered pin of the present invention is used, i.e., inserted ram-like into a sleeve 14 filled with hardenable mass 30, the cross-sectional flow of the mass is full and complete along the entire length of the sleeve. Voids or empty spaces are virtually 100% eliminated, the mass does generally not cavitate and there is greatly improved contact and adhesion between the pin, sleeve and mass along the entire sleeve. Since the tapered pin does not displace substantially more than its volume, voids are not created and consequently, a more uniform displacement and extrusion of the mass through the pores in the sleeve is accomplished.

The tapered configuration to the anchoring pin 40 uniquely harmonizes with the fluid dynamics involved during the ram installation of a central fastening element, producing a double effect: the first being the enhanced adhesion of the mass to the anchoring pin and sleeve surface; the second, being the mushroom or toggle effect of the mass as extruded through the pores of the sleeve, wherein the mass fills the spaces or voids in the masonry at a diameter larger than the hole, prepared in the masonry, through which the anchor has passed while maintaining continuous adhesion of the mass within the sleeve. Consequently, the rate of taper may be chosen within a relatively broad range; the high end of the range (i.e. large angle of taper approaching the shape of a pointed needle), being limited by the need to insure sufficient extrusion of the hardenable mass to provide an effective toggle or holding effect of the mass outside the sleeve, after curing, while the low end (i.e. small angle of taper approaching a cylindrical rod), is limited by the need to insure against cavitation and the creation of voids within the sleeve, thereby insuring adhesion within the sleeve, while providing sufficient extrusion.

The same basic fluid dynamics apply for all sizes up to at least 1 ¼" diameter. In a typical application involving stabilization of a brick facade over block wall with a void, a ⅜ × 8" stainless steel threaded cylindrical rod in conjunction with an epoxy gel filled screen tube is usually specified. Typically, pull tests of this configuration result in screen failure at less than 2,000 pounds tension. The reason for consistent screen failure in such installations is a poor distribution of epoxy between the cylindrical stud and the inside diameter of the screen tube (too much epoxy has axially displaced, leaving a substantial void along the length of the cylindrical central fastening element and the inside diameter of the screen tube. See FIGS. 2 and 3). In using the tapered pin of the present invention in place of the ⅜×8" stainless steel threaded stud, the same pull tests have an average yield of approximately 5,000 pounds tension due to the added involvement of the central anchoring element in the overall performance.

Typically tapered pins may be manufactured by screw machine or double disc grinding of cut-to-length threaded studs. An optimum taper rate of ⅛" diameter per 7 ¼" of length achieves the desired adhesive flow characteristics. Stainless steel, which is generally used, offers the greatest combination of lap shear (performance) and marketability due to its corrosion resistance).

The tapered pin 40 can if desired be effectively used without the mesh or screen in situations where the contractor chooses to inject directly into masonry substrates containing one or more bores or holes (rather than pre-filling screen tubes as is generally done). This method presents the contractor with a tradeoff of considerations. On the one hand, he saves the cost of the screen tube, while on the other hand, he has to fill each hole on location, and must carefully meter the volume of adhesive injected - he is running the risk of over or under filling substrates. The use of a tapered anchoring pins, of the type being disclosed, in this system provide benefits and advantages as with a porous sleeve in that greater adhesion and more effective toggling is ultimately obtained, even with the lower consistancy and accuracy in filling the bore.

The tapered anchoring pin is particularly adaptable to the fastening systems illustrated in my copending application Ser. No. 07/047,167 wherein a perforated tubular sleeve having at least two axially arranged porosities, is used. The tapered pin insures that each section of distinct porosity remains completely filled with adhesive material maintaining cohesion and unity between all sections, and the optimum radial extrusion of the hardenable mass along the entire length. The sleeve may of course, be formed of a wire screen, or a solid tube having hole or slot-like perforations of different porosity along its sectional lengths. Bands of impervious material may also be interposed along the length of the sleeve where desired or needed. Of course, the anchoring pin may, as indicated earlier, be used alone or with sleeves of the more conventional prior art type.

While only a few embodiments of the present invention have been shown and described, it is to be understood that many changes and modifications can be made hereto without departing from the spirit and scope hereof.

What is claimed is:

1. Apparatus for forming, in combination with a hardenable thixotropic adhesive mass, a fastening between spaced masonry elements having random voids and fissures, said apparatus comprising an axially elongated cylindrically shaped porous sleeve filled with the hardenable mass, having a leading end and a trailing end, said sleeve being closed at the leading end of said sleeve and open at the trailing end of said sleeve, said sleeve being provided with at least two axial sections each having a different mesh size so as to selectively regulate the amount of hardenable adhesive passing through said screen along the length thereof, and ram means insertable within the trailing end of said sleeve comprising a conically tapered pin to extrude a minimal amount more than the volume of said pin of hardenable mass from said sleeve.

2. The apparatus according to claim 1, wherein said screen has a more porous size in the axial section adjacent the trailing end than in the axial section adjacent the leading end of said sleeve.

3. The apparatus according to claim 1 include at least one band of impervious materail situated along the length of said sleeve to prevent extrusion of said adhesive radially therefrom.

* * * * *